United States Patent
Reichel et al.

(10) Patent No.: US 7,324,285 B2
(45) Date of Patent: Jan. 29, 2008

(54) OPTICAL ELEMENTS AND IMAGING OPTICS COMPRISING THEM

(75) Inventors: Steffen Reichel, Mehlingen (DE); Wolfram Beier, Essenheim (DE); Frank-Thomas Lentes, Bingen (DE); Yoshio Okano, Mainz (DE); Jochen Alkemper, Klein-Winterheim (DE); Jose Zimmer, Ingelheim (DE); Joseph S. Hayden, Clarks Summit, PA (US); Carsten Weinhold, Clarks Summit, PA (US); Ulrich Peuchert, Bodenheim (DE); Martin Letz, Mainz (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 11/523,845

(22) Filed: Sep. 20, 2006

(65) Prior Publication Data

US 2007/0127140 A1    Jun. 7, 2007

(30) Foreign Application Priority Data

Sep. 21, 2005  (DE) .................... 10 2005 045 199
Feb. 1, 2006    (DE) .................... 10 2006 004 923
Jul. 24, 2006   (DE) .................... 10 2006 034 682

(51) Int. Cl.
*G02B 1/00*     (2006.01)
*G02B 9/00*     (2006.01)
*C03C 3/00*     (2006.01)
*C03C 14/00*    (2006.01)

(52) U.S. Cl. .................. 359/642; 359/754; 359/796; 501/11; 501/32

(58) Field of Classification Search ................ 359/355, 359/356, 642, 754, 796; 501/11, 32, 900, 501/904

See application file for complete search history.

(56) References Cited

U.S. PATENT DOCUMENTS 3,640,887 A    2/1972  Anderson (Continued)

FOREIGN PATENT DOCUMENTS

EP    1 336 596    8/2003

(Continued)

OTHER PUBLICATIONS

"The Properties of Optical Glass" Bach, Hans; Neuroth, Norbert (Ed), Berlin, Springer 1995, pp. 28-30 ( in English).

(Continued)

*Primary Examiner*—David N. Spector
(74) *Attorney, Agent, or Firm*—Michael J. Striker

(57) ABSTRACT

The optical elements are made from an opto-ceramic material that is characterized by high density, transparency for visible light and IR, high refractive index, high Abbe number and outstanding relative partial dispersion. Mixed oxides are sintered to obtain the opto-ceramic material. The mixed oxides contain zirconium oxide and hafnium oxide mixed with one or more oxides of yttrium, scandium, lanthanide elements, and optionally mixed with one or more of $SiO_2$, $Na_2O$, and $TiO_2$. Alternatively the mixed oxides contain zirconium oxide and hafnium oxide mixed with CaO and/or MgO and optionally mixed with one or more of $SiO_2$, $Na_2O$, and $TiO_2$. In addition, the mixed oxides can also include one or more oxides of Al, Ga, In, and Sc; optionally one or more oxides of yttrium, some lanthanide elements; and optionally one or more of $SiO_2$, $Na_2O$, MgO, CaO, and $TiO_2$.

26 Claims, 12 Drawing Sheets

U.S. PATENT DOCUMENTS

| | | |
|---|---|---|
| 6,268,303 B1 * | 7/2001 | Aitken et al. .................. 501/63 |
| 6,908,872 B2 | 6/2005 | Tanaka et al. |
| 7,148,164 B2 * | 12/2006 | Minamikawa et al. ......... 501/4 |
| 2004/0104672 A1 | 6/2004 | Shiang et al. |
| 2005/0065012 A1 | 3/2005 | Rosenflanz |
| 2007/0091472 A1 * | 4/2007 | Alkemper et al. .......... 359/796 |

FOREIGN PATENT DOCUMENTS

| | | |
|---|---|---|
| JP | 2000203933 | 7/2000 |
| WO | 2005/036235 | 4/2005 |

OTHER PUBLICATIONS

Schott: "Series on Glass and Glass Ceramics" Science, Technology and Application, XVII, p. 410 and 414, 2. Corr. Print, 1998 (in English).

M. Wolff, R. Clasen: "Investigation on the Fabrication of . . . " CFI/BER. DKG 82, 2005, No. 13, pp. 166-169 (in English).

M. Wolff, R. Clasen: "Fabrication of Transparent Polycrystalline Zirconia . . . " CFI/BER. DKG 82, 2005, No. 9, p. E49 (in English).

* cited by examiner

OPTICAL ELEMENTS AND IMAGING OPTICS COMPRISING THEM

The present invention relates to refractive, diffractive or transmittive optical elements made of opto-ceramics having high transparency for visible light and/or infrared light. In particular, the invention relates to optical elements of those opto-ceramics which are suitable for imaging optics, such as for example objectives having reduced chromatic aberrations, in particular with nearly apochromatic imaging behaviour.

According to the present invention, by an opto-ceramic is meant a substantially single-phase polycrystalline material based on an oxide and having high transparency. Accordingly, opto-ceramics are a special subclass of ceramics. In this case, by "single-phase" is meant that at least more than 95% of the material, preferably at least 97%, further preferably at least 99% and most preferably 99.5 to 99.9% of the material are present in the form of crystals of the target composition. The single crystallites are arranged in a compact manner and, based on the theoretical densities, at least 99%, preferably at least 99.9%, further preferably at least 99.99% are achieved. Correspondingly, the opto-ceramic is nearly free of pores. The crystal structure corresponds either to a cubic $ZrO_2$ structure or to a garnet structure. In this case, the stabilisation of $ZrO_2$ in the cubic symmetry is effected by the addition of certain oxides or oxide mixtures in certain amounts Opto-ceramics are different from conventional glass ceramics, because the latter have a high proportion of amorphous glass phase besides a crystalline phase. Also, conventional ceramics do not attain these high densities which are present in opto-ceramics. Neither glass ceramics nor ceramics can have the advantageous properties of opto-ceramics, such as certain refractive indices, Abbe numbers, values of the relative partial dispersion and especially the advantageous high transparency for light in the visible range and/or infrared light.

The main target in the development of imaging optics is to attain a sufficient optical quality with a compact set-up of the optic which is as light as possible. In particular for uses with digital image detection in electronic apparatuses, such as for example digital cameras, objectives of mobile phones and the like, the imaging optic has to be formed very small and light. In other words, the total amount of imaging lenses has to be minimal. This requires transparent materials with high refractive index and a dispersion which is as low as possible, thus to allow the design of very compact imaging optics with nearly apochromatic imaging behaviour.

The optical elements of the opto-ceramic may be used in lens systems together with lenses of glass, but also with other ceramic lenses, in particular also in digital cameras, cameras of mobile phones, in the field of microscopy, microlithographic data storage or other uses in the field of consumer or industrial uses, such as for example digital projection and further display techniques. But also in mainly monochromatic uses, such as the optical storage technologies, compact systems can be realized by the means of materials with high refractive index.

In the case of microscopy, imaging optics with nearly diffraction limited performance are required, for the ocular as well as the objective.

In the field of defence, transparent optics are required which have high transmittance in the visible (380 to 800 nm) and also the infrared spectral range, up to 8,000 nm, ideally up to 10,000 nm, and, in addition, which are resistant against influences from outside, such as mechanical action, shock, temperature, change of temperature, pressure etc.

At the moment, the development of imaging optics is limited by the optical parameters of the materials which are available. By available glass melt and glass forming techniques, only such kinds of glass with high quality can be produced which in an Abbe diagram, in which the refractive index is plotted against the Abbe number, are below the line which goes through the points Abbe number=80/refractive index=1.7 and Abbe number=10/refractive index=2.0. This imaginary line is shown in FIG. 2a by a dotted line. In more detail, glasses having a refractive index of between about 1.9 and about 2.2 and an Abbe number in the range of between about 30 and 40 tend to instability, so that it is difficult to produce such glasses in higher amounts and with sufficient quality. Also glasses having a refractive index of between about 1.8 and about 2.1 and an Abbe number in the range of between about 35 and 55 tend to instability.

The definitions of the refractive index (refractive index at a wavelength of 587.6 nm, $n_D$), the Abbe number $v_d$ and the relative partial dispersion ($P_{g,F}$) are basically well known for a person skilled in the art and are described in more detail in specialized literature. In the sense of the present invention, the terms are used according to the definitions in "The properties of optical glass"; Bach, Hans; Neuroth, Norbert (Ed.), Berlin (i.a.): Springer, 1995; or Schott, "Series on glass and glass ceramics", science, technology, and applications, XVII, p. 410, 2., corr. print., 1998, XVII, p. 414.

Transparency for visible light means an internal transmittance (i.e. the light transmittance cleared from the reflection loss) which is, in a window with a width of at least 200 nm, for example in a window of 400 to 600 nm, a window of 450 to 750 nm or preferably a window of 400 to 800 nm, in the range of the visible light having wave lengths of 380 nm to 800 nm, higher than 70%, preferably higher than 80%, further preferably higher than 90%, particularly preferably higher than 95%, at a layer thickness of 2 mm, preferably even at a layer thickness of 3 mm, particularly preferably at a layer thickness of 5 mm or more.

Transparency in the infrared range means an internal transmittance (i.e. the light transmittance cleared from the reflection loss) which is, in a window with a width of at least 1000 nm, for example in a window of 1000 to 2000 nm, a window of 1500 to 2500 nm or preferably in a window of 3000 to 4000 nm, in the range of the infrared light of 800 nm to 5000 nm, higher than 70%, preferably higher than 80%, further preferably higher than 90%, particularly preferably higher than 95%, at a layer thickness of 2 mm, preferably even at a layer thickness of 3 mm, particularly preferably at a layer thickness of 5 mm or more.

Ideally, the material has in a wavelength window with a width of more than 200 nm between 5000 nm and 8000 nm, preferably between 6000 and 8000 nm, further preferably between 7000 and 8000 nm, a transmittance (now incl. reflection loss) of more than 20%, at a thickness of 3 mm.

Besides the requirements of transparency, the refractive index and the Abbe number, the relative partial dispersion plays an important role when selecting an optical material. If nearly apochromatic optics have to be produced, thus the combination of materials with nearly the same relative partial dispersion, but a big difference in the Abbe number is necessary. When the relative partial dispersion $P_{g,F}$ is plotted against the Abbe number (FIG. 2b), most glasses are on one line ("straight standard line"). Therefore, materials are desired, having a combination of Abbe number and relative partial dispersion which is different from this behaviour.

At the moment, materials which are above the aforementioned imaginary line in an Abbe diagram are only single crystals or polycrystalline materials.

However, the production of single crystals by the known crystal-producing methods is very costly and has enormous limitations with respect to the chemical composition. Furthermore, crystals for most uses cannot be produced close to the final form so that this results in an enormous post-processing effort.

Although polycrystalline ceramics can be produced within a broader composition range, normally they have insufficient optical qualities, in particular with respect to the homogeneity of the refractive index and the transparency. Till today, only few composition ranges and structure types are known, in which transparent ceramics with sufficient optical quality can be produced.

Therefore, polycrystalline ceramics have only been used in a limited amount in optical applications till today. Thus for example, the Japanese Patent Publication JP 2000-203933 discloses the production of polycrystalline YAG by means of a special sintering process. Also the production of polycrystalline YAG with optical quality as laser host material has been achieved a short time ago, for example for doping with laser-active ions, such as for example Nd.

In U.S. Pat. No. 6,908,872, a translucent ceramic is described which in every case uses barium oxide as an oxide which is present in the ceramic. The ceramics thus obtained have a perovskite structure and are para-electric. However, ceramics which contain such barium containing phases with a perovskite structure often have insufficient optical imaging quality. This results from the tendency of much perovskites to form distorted ferro-electric crystal structures and therewith to loose their optical isotropy. This leads, i.a., to an undesired birefringence of the crystals from which the ceramic is constructed.

U.S. Pat. No. 3,640,887 describes a ceramic which comprises one or more oxides of the series of elements which are called rare earths, together with i.a. zirconium or hafnium oxide, wherein the ionic radii of the respective oxides are important.

US 2005/0065012 relates to glasses and glass ceramics which can also be formed into optical elements, comprising niobium or tantalum oxide as main ingredient.

From EP 1 336 596 A1, transparent ceramic bodies based on oxides of the rare earths are known.

In document cfi/Ber. DGK 82 (2005) No. 9, p. E49 Clasen describes that he has produced polycrystalline cubically stabilized Zirconia sintered to a transparent ceramic. However, the mentioned transmission is quite low.

The object of the present invention is to provide an optical element of an opto-ceramic. Besides their high density and transparency, the opto-ceramics have a high refractive index, a high Abbe number and/or an excellent special relative partial dispersion. These parameters cannot be achieved with conventional glasses, glass ceramics, single crystal materials or polycrystalline ceramics respectively materials.

For distinct applications, the optical element should have transparency for light in the visible range and/or for infrared light, in particular for visible light. Only insofar a special use allows self-colouring, colouring ions can be present in the opto-ceramic.

According to a further aspect of the present invention, an imaging optic comprising an optical element of an opto-ceramic should be provided, preferably with a nearly apochromatic imaging behaviour.

This and further objects are solved according to the present invention by an optical element according to claim 1 as well as by an imaging optic having the features according to claim 11. Further advantageous embodiments are the subject matters of the dependent claims.

The opto-ceramics, from which the optical elements according to the present invention are prepared, can be prepared by sintering a mixture of the following oxides:

a) zirconium oxide and/or hafnium oxide, mixed with one or more of the oxides of yttrium, scandium, an oxide of the elements of the lanthanum series (La, Ce, Pr, Nd, Pm, Sm, Eu, Gd, Tb, Dy, Ho, Er, Tm, Yb, Lu); or potassium and/or magnesium or b) an oxide of an element of the group III or IIIa of the periodic table, preferably aluminium oxide and/or gallium oxide and/or indium oxide and/or scandium oxide, mixed with one or more of the oxides of gadolinium, lutetium, ytterbium, yttrium, lanthanum, cerium, praseodymium, neodymium, promethium, samarium, europium, terbium, dysprosium, holmium, erbium, thulium, with the proviso that oxides of an active element of the lanthanum series, namely Ce, Pr, Nd, Pm, Sm, Eu, Tb, Dy, Ho, Er, Tm, are present in the opto-ceramic in a total amount of either at most 100 ppm by weight or at least 15% by mole, wherein preferably in each case optionally as normal auxiliary sintering agents one or more of the oxides, such as $SiO_2$, $Li_2O$, $Na_2O$, MgO, CaO, and $TiO_2$, may be added to above mixture. However, in order not to shift the UV edge too far towards the visible spectrum, which might cause yellowish discoloration, the total content of one or more of the above sintering agents, preferably of $TiO_2$ in mixture containing composition a) and that sintering agent(s) is limited to <10% by mole, preferable <6% by mole, more preferable <3% by mole, most preferable the ceramic is free of sintering agent like $TiO_2$. The total content of one or more of above sintering agents, in mixture containing composition b) and that sintering agent(s) is preferably <5% by mole, more preferable <3% by mole, most preferable the ceramic is free of sintering agent. With regard to mixture b) preferably $TiO_2$ is not used as a sintering agent.

In the composition range a), the opto-ceramics result in cubic $ZrO_2$ phases. Thus for example, mixtures of zirconium oxide and 8 to 45% by mole, preferably 12 to 45% by mole, further preferably 15 to 45% by mole, further preferably 20 to 45% by mole, further preferably 25 to 45% by mole, further preferably 30 to 45% by mole yttrium oxide have a stabilized cubic crystal structure.

The formation of a cubic $ZrO_2$ phase at room temperature can in particularly be guaranteed by the addition of suitable additives.

Without stabilizing oxides, such as for example $Y_2O_3$, CaO, MgO or rare earths ions, according to the phase diagram, $ZrO_2$ has at room temperature a monoclinic structure with low symmetry. Only by an increase of the temperature, the material turns into the cubic structure, wherein therein between a tetragonal phase exists.

Through addition of e.g. $Y_2O_3$, the range of the presence of the cubic $ZrO_2$ phase is broadened, wherein above about 8% by mole of $Y_2O_3$ the cubic basic $ZrO_2$ structure is stabilized at temperatures as low as room temperature. Compositions comprising at least 8% by mole of $Y_2O_3$ allow the production of an opto-ceramic.

The opto-ceramics according to a) can be described by the following formula:

$$(1-m)\{z1[ZrO_2]z2[HfO_2](1-z1-z2)[X_2O_3]\}m[A]$$ or $$(1-m)\{z1[ZrO_2]z2[HfO_2](1-z1-z2)[MO]\}m[A],$$

wherein z1+z2 is less than or equal to 0.92 and preferably less than or equal to 0.90, wherein z1, z2 and m are higher than or equal to zero, m is less than 0.10 and preferably less than 0.06, more preferably less than 0.03, most preferably equal to zero, and X is selected from Y, Sc, La, Ce, Pr, Nd, Pm, Sm, Eu, Gd, Tb, Dy, Ho, Er, Tm, Yb, Lu or a mixture of two or more of these elements, preferably of Y, Yb and Lu or a mixture of two or the three elements, and is particularly preferably Y. M is selected from Ca and Mg and whereas A represents one ore more additional minority components, i.e. $SiO_2$, $Na_2O$, or $TiO_2$.

In most preferred opto-ceramics m is equal to or close to zero, wherein A is $TiO_2$.

Regarding their particularly preferable properties, the following compounds are particularly suitable as opto-ceramics and pertain to the preferable embodiments of the present invention: $z1[ZrO_2](1-z1)[Y_2O_3]$ with z1 less than or equal to 0.90. As mentioned above, these opto-ceramics have a cubic $ZrO_2$ crystal structure.

For example a Zirconia based opto-ceramics having the composition 10% by mole $Y_2O_3$ and 90% by mole $ZrO_2$ comprise the following optical properties:

$n_D=2.1603$; $v_d=33.6$; $P_{g,F}=0.575$.

The opto-ceramics according to the composition range b) have a garnet structure. The opto-ceramics can be described by the following formula:

$$(1-m)\{(M1)_{3+z3}(M2)_{5-z3}O_{12}\}m\{A\}$$

wherein z3 is a value in the range of between −1 and +1, m is a value between or equal to zero and less than 0.05; preferably less than 0.03, more preferable close to or equal to zero;

M1 is selected from Y, La, Gd, Lu, Yb, Ce, Pr, Nd, Pm, Sm, Eu, Tb, Dy, Ho, Er, Tm or a mixture of one or more of these elements, wherein the active lanthanides Ce, Pr, Nd, Pm, Sm, Eu, Tb, Dy, Ho, Er and Tm are present in the opto-ceramic in a total amount of either at most 100 ppm by weight or at least 15% by mole, based on the amount of these oxides;

M2 is selected from one or more of the elements of the group III or IIIa of the periodic table, preferably from Al, Ga, In, Sc or a mixture of two or more of the elements, and A is selected from one or more of the components $SiO_2$, $Li_2O$, $Na_2O$, $CaO$, or $MgO$ being sintering agents.

Regarding their particularly preferable properties, the following compounds are particularly suitable as opto-ceramics and pertain to the preferable embodiments of the present invention: $Y_3Al_5O_{12}$, $Lu_3Al_5O_{12}$, $Gd_3Ga_5O_{12}$, $Y_3(Sc_2Al_3)O_{12}$.

According to the present invention, there is also provided an imaging optic with lenses of at least two different transparent materials, wherein at least one lens is formed respectively consists of an opto-ceramic, such as described above.

By the use of two different transparent materials in a mapping optic, such as for example in an objective, novel imaging properties can be provided. In particular, to this also pertains the possibility of achromatizing the imaging optic with a relatively low number of optical elements which cannot be realized with the known kinds of glass.

In an exemplary way, in this case overall only three optical elements are used for the formation of an objective having nearly apochromatic imaging properties.

Thus overall according to the present invention, compared to the use of multi lens systems according to the prior art, compact imaging optics for colour correction may be achieved which have a very low weight and a low depth, and the production of which causes relatively low costs.

In this case, the lenses may act only in a refractive sense. The lenses can be arranged singly or with a certain distance between them. Basically, some of the lenses can also be coupled to a group of lenses, for example as a duplet of lenses, triplet of lenses, etc.

According to the present invention, at least one of the lenses may also have diffractive structures, which are for example embossed or pressed onto or written into the surface of the lens or a volume of the lens, respectively for example in the form of Fresnel zone plates, diffraction gratings, or blazed diffraction gratings.

According to a further preferable embodiment, an imaging optic comprises at least one lens of a glass besides a lens of the opto-ceramic, such as described above.

In this case according to the present invention, the relative partial dispersions ($P_{g,F}$) of the respective glass and the opto-ceramic are nearly the same, preferably there is a difference of less than about 10%, wherein the difference of the Abbe numbers of the respective glass and the opto-ceramic is higher than 10, preferably higher than 20. By providing a relatively high difference between the Abbe numbers with substantially identical relative partial dispersion at the same time, nearly apochromatic imaging properties of the imaging optic can be achieved.

For the production of the above mentioned opto-ceramics, starting powders, such as oxide mixtures mentioned above, are used according to the target composition. The average particle size of each compound is smaller than 2 micrometers, preferably smaller than 1 micrometer. The powders are converted by uniaxial pressing into mouldings, wherein the pressure used is in the order of 30 MPa. Subsequently, the mouldings are further compacted by a cold-isostatic press, wherein in this case the used pressure is in the order of 200 MPa.

Sintering will preferably be conducted in a vacuum sintering furnace at temperatures of about 1750° C. and a sintering period of time of about 2 hours. The vacuum used is about $10^{-3}$ to $10^{-6}$ hPa.

Subsequently, the sintered sample is pressed in a hot-isostatic manner (HIP) at suitable conditions regarding the temperature of about 1600 to 1800° C., regarding the period of time, 1 to 3 hours, and regarding the pressure, 50 to 200 MPa. The pressure medium is argon or argon supplemented with oxygen.

Optionally, the starting powder may also be granulated. For this, the powder is ground in a ball mill together with a binder (e.g. ethyl or silicate binder, for example 0.5% by weight in ethyl alcohol) for 12 hours and subsequently dried in a spray drying facility.

Further optionally, instead of the use of oxide mixtures also a powder having the target composition may be processed directly. This can be produced e.g. by co-precipitating or plasma-burning of aerosols.

The above mentioned conditions for the production of opto-ceramics having garnet structure may substantially also be used for the production of transparent yttrium-stabilized ZrO2 ceramics.

Further targets, features, advantages and application possibilities of the invention will follow from the description of embodiment examples below which are also shown by figures. Here, all features, described and/or presented by figures, are in themselves or in any combination the subject matter of the invention, independently of their summarizing in single patent claims or their dependency.

DRAWINGS

Below, the invention will be described in an exemplary way and with reference to the accompanied figures, wherefrom further features, advantages and problems to be solved will follow and wherein:

FIG. 1 shows a cross section of four examples of optical elements according to the present invention, wherein 1 is a biconvex lens, 2 is a biconcave lens, 3 is a transmittive optical element and 4 is a spherical lens;

FIG. 2a summarizes in an Abbe diagram the properties of different glasses and opto-ceramics according to the present invention;

FIG. 2b summarizes in a diagram the position relationship of glasses and opto-ceramics according to a first embodiment of the present invention, wherein the relative partial dispersion ($P_{g,F}$) is plotted against the Abbe number;

FIG. 2c summarizes the position relationship of glasses and opto-ceramics in an Abbe diagram according to a second embodiment of the present invention;

Figure 3:
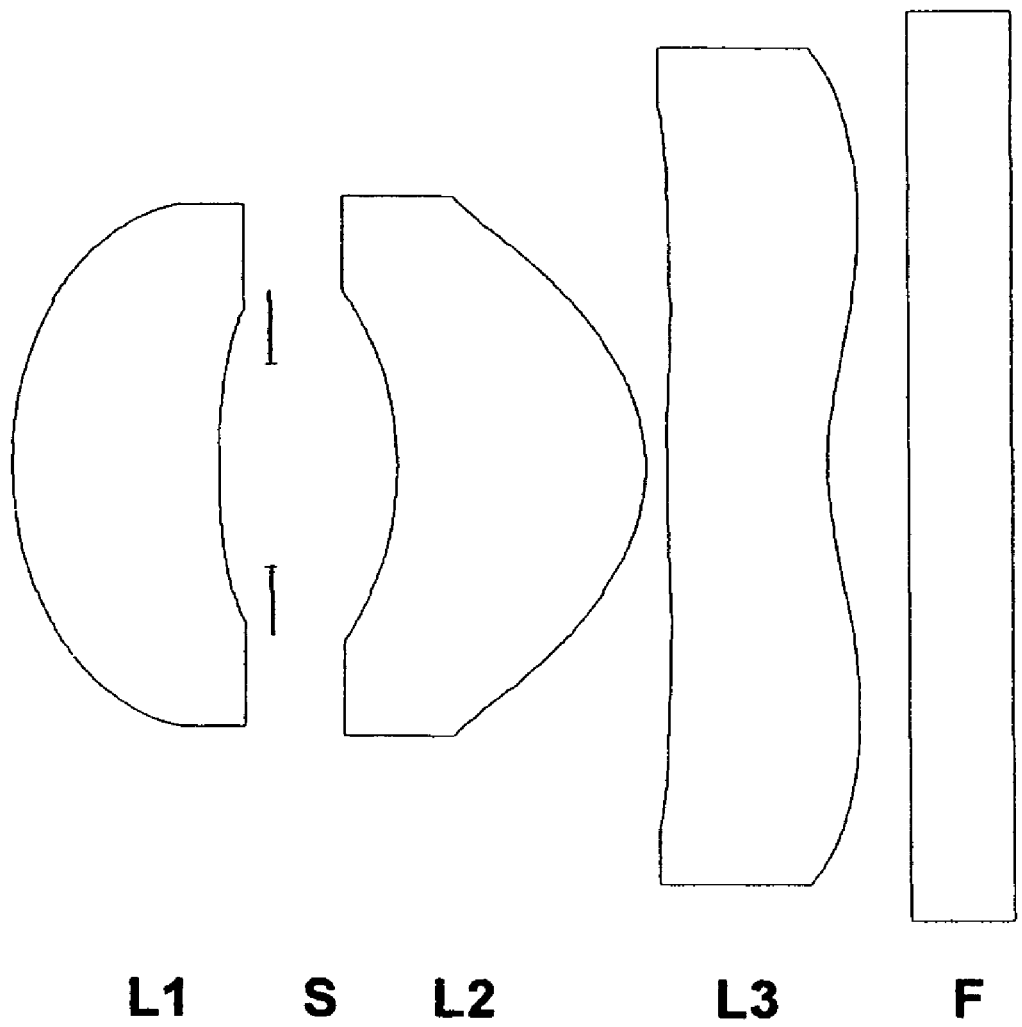
FIG. 3 shows an imaging optic according to an embodiment of the present invention.
Figure 5A:
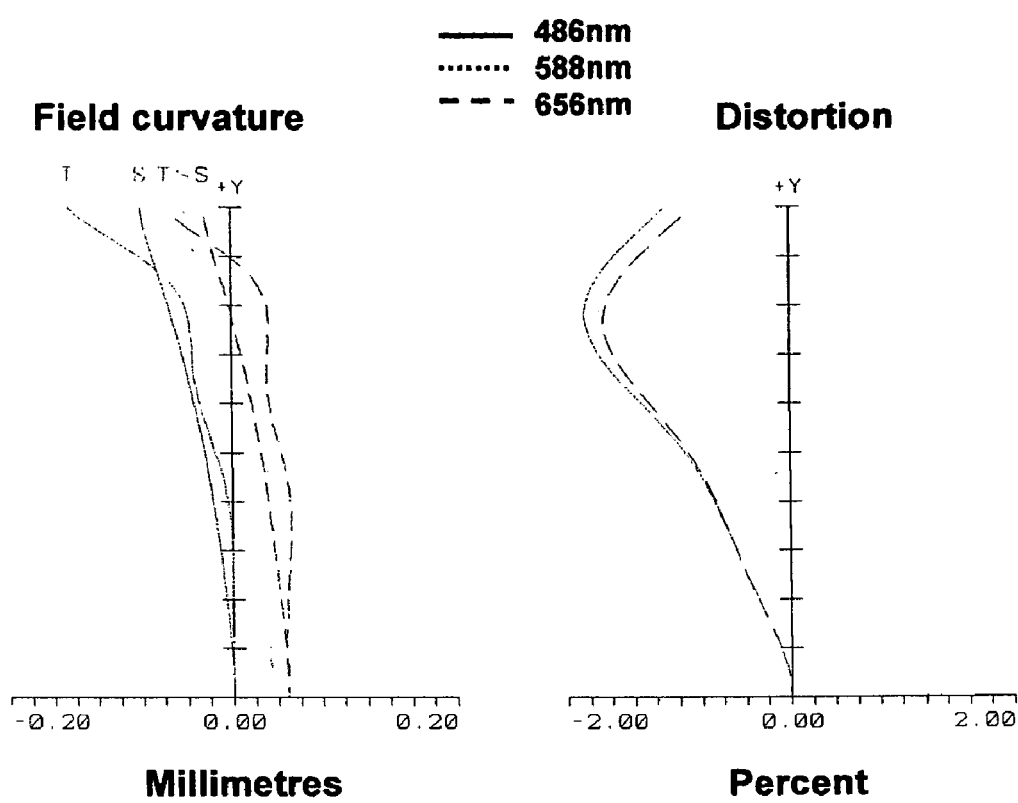
Figure 5B:
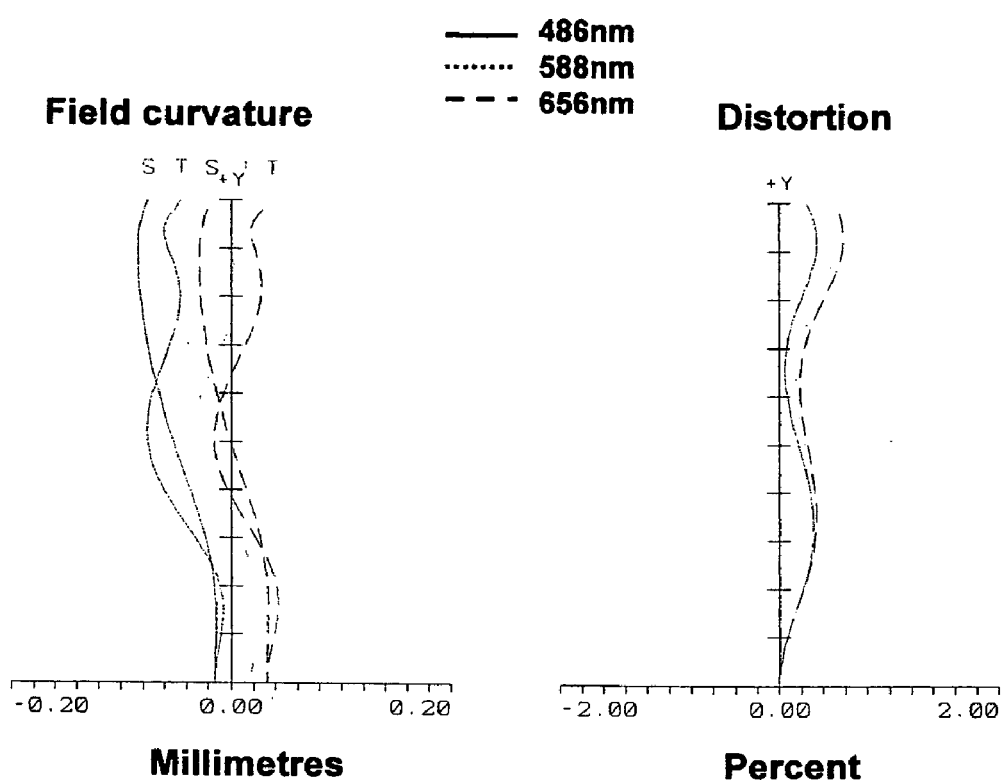
Figure 6A:
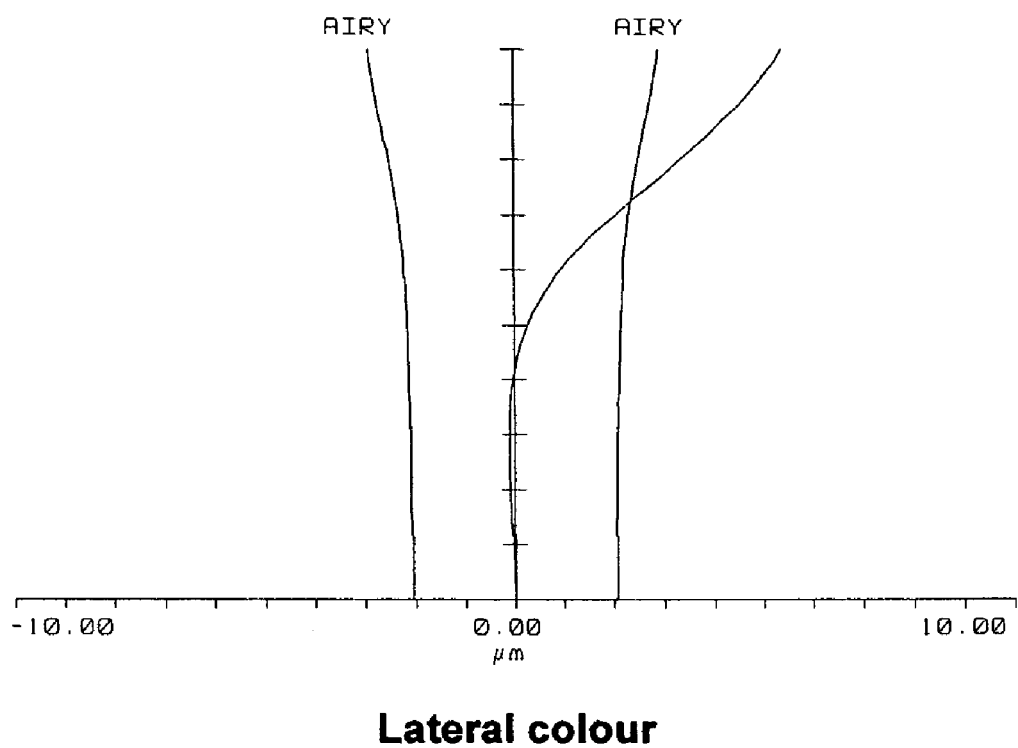
Figure 6B:
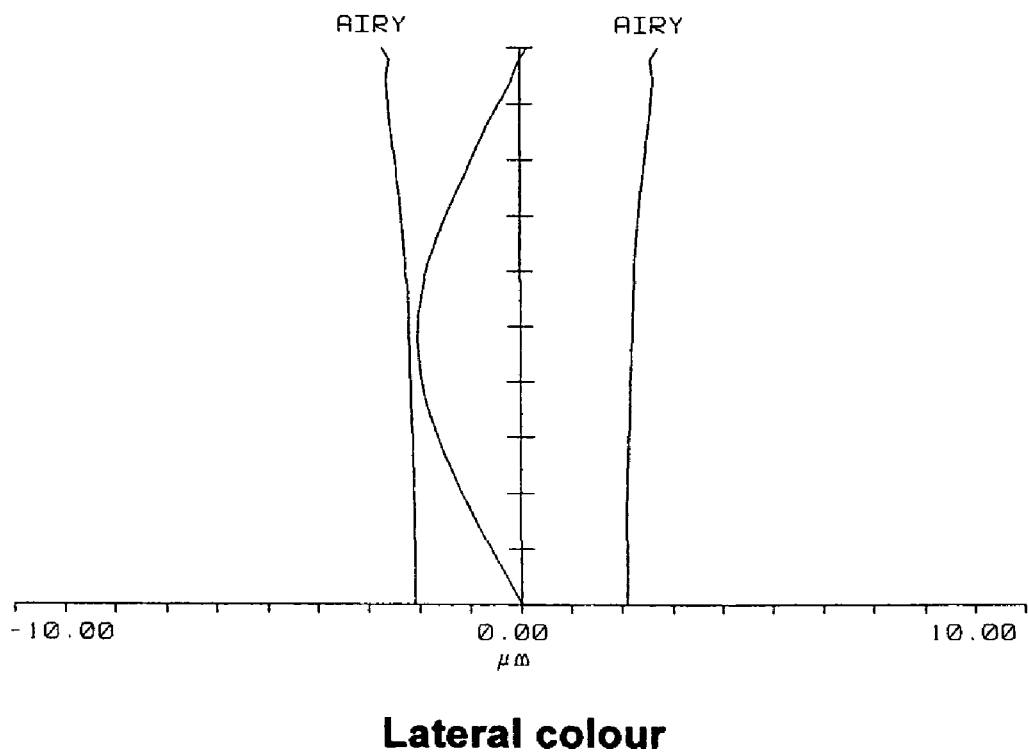
Figure 7A:
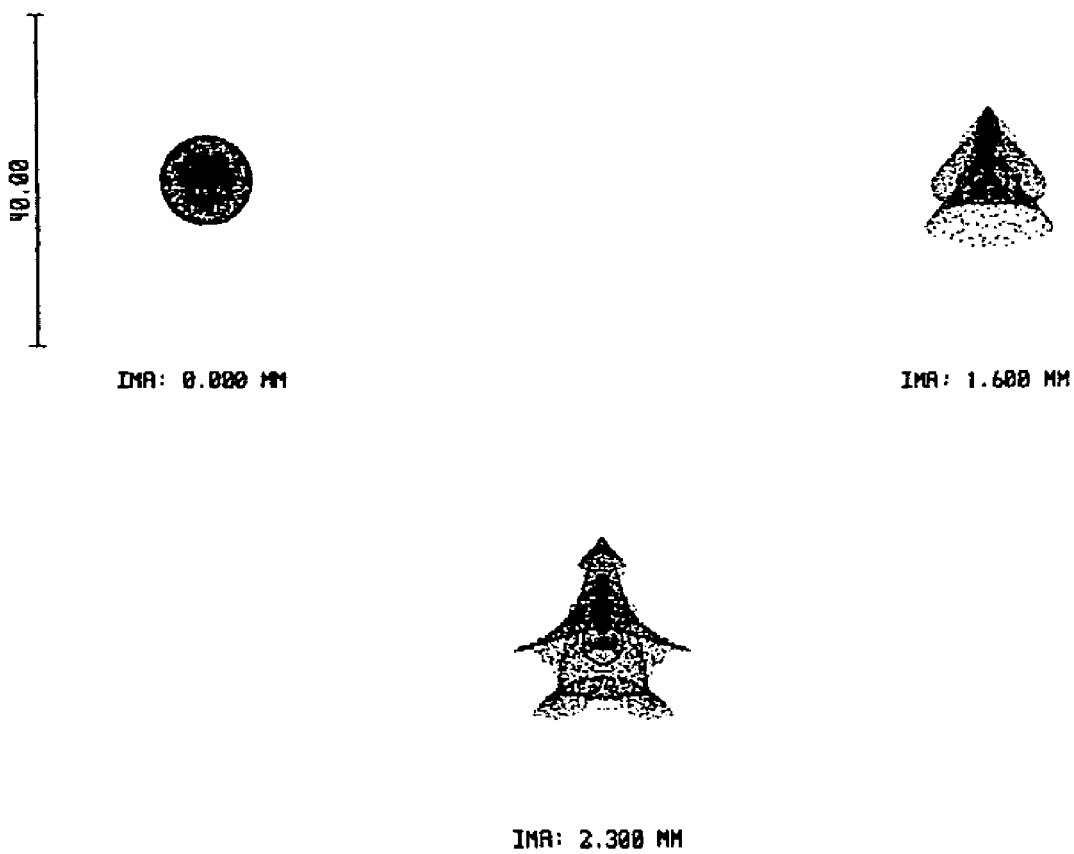
Figure 7B:
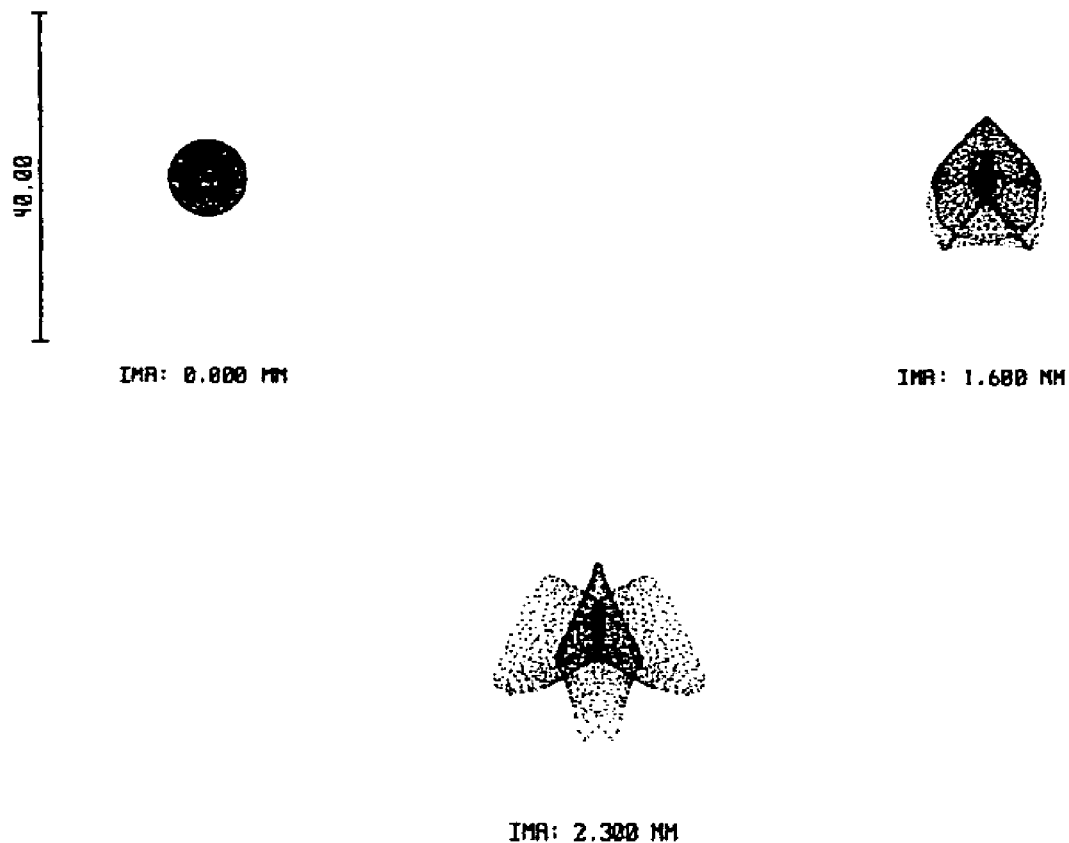

FIGS. 5a and 5b present imaging properties of the objective according to FIG. 3 for the use of conventional materials (FIG. 5a) and the use of a combination of materials according to the present invention (FIG. 5b);

FIGS. 6a and 6b show the chromatic imaging aberrations (lateral colour) of the objective according to FIG. 3 for the use of conventional materials (FIG. 6a) and the use of a combination of materials according to the present invention (FIG. 6b); and FIGS. 7a and 7b show the spot size of the objective according to FIG. 3 for the use of conventional materials (FIG. 7a) and for the use of a combination of materials according to the present invention (FIG. 7b).

Figure 1:
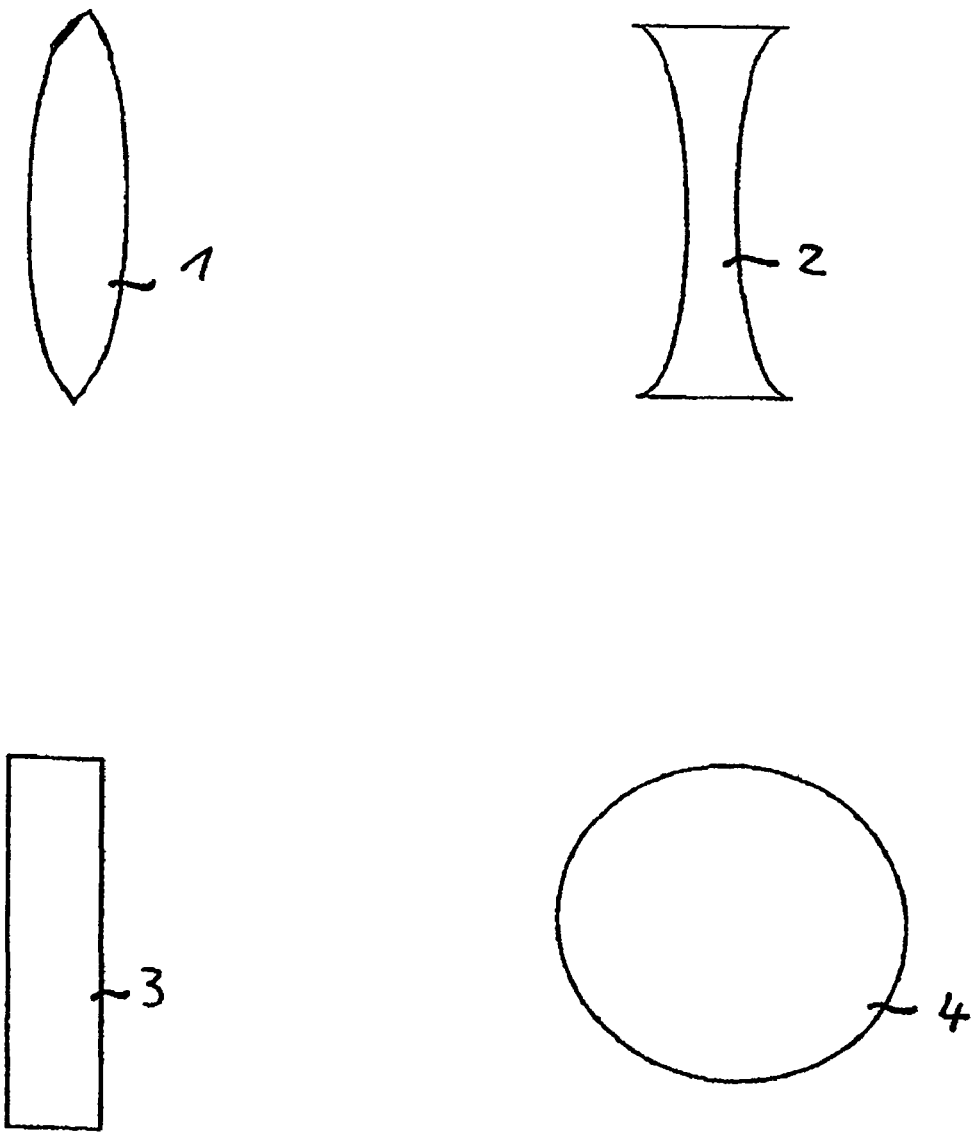
Figure 2A:
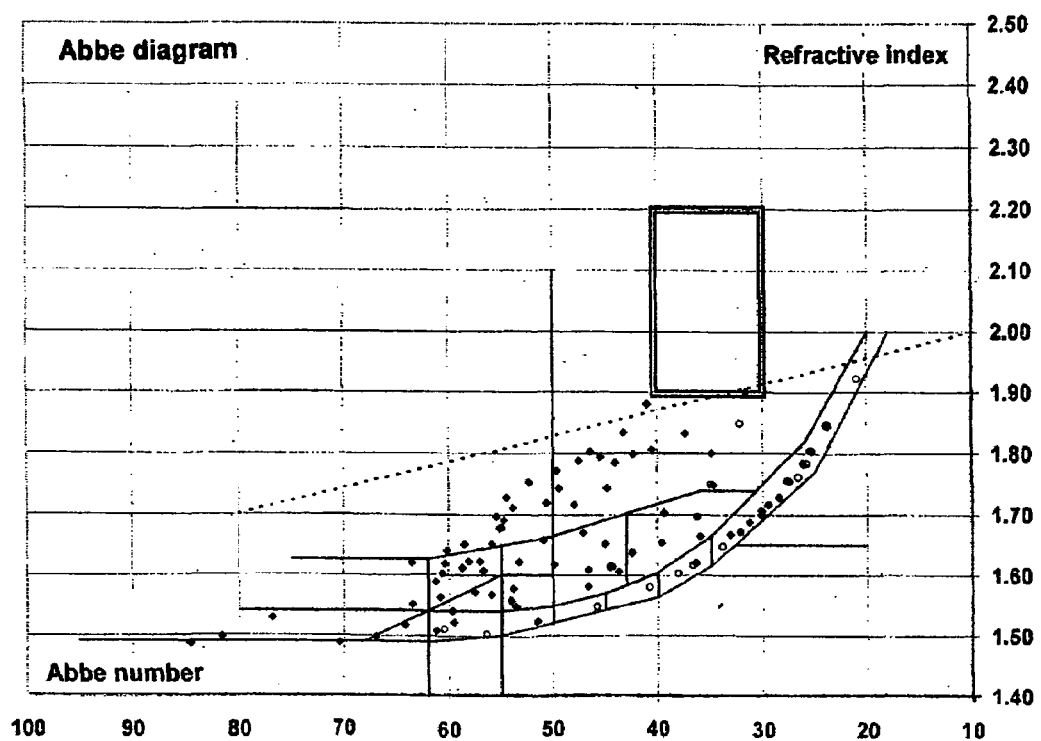

In the Abbe diagram according to FIG. 2a, points which are shown as a circular symbol represent exemplary kinds of glass which can be produced with high optical quality by the glass melt techniques available today. As can be easily seen in FIG. 2a, glasses above the dotted line which goes through the points Abbe number=80/refractive index=1.7 and Abbe number=10/refractive index=2.0 can be produced by present glass melt and glass forming techniques only with limitations. In particular, glasses having a refractive index in the range of between 1.9 and 2.2 in combination with an Abbe number of between about 30 and 40 are instable (see rectangle in FIG. 2a). As explained below, the opto-ceramics according to the present invention are transparent materials which have a refractive index of between about 1.9 and 2.2, preferably of between 1.9 and 2.0, and the Abbe number of which is at the same time in the range of between about 30 and 45. This provides the possibility to use novel combinations of materials for the achromatization of lens systems.

Figure 2B:
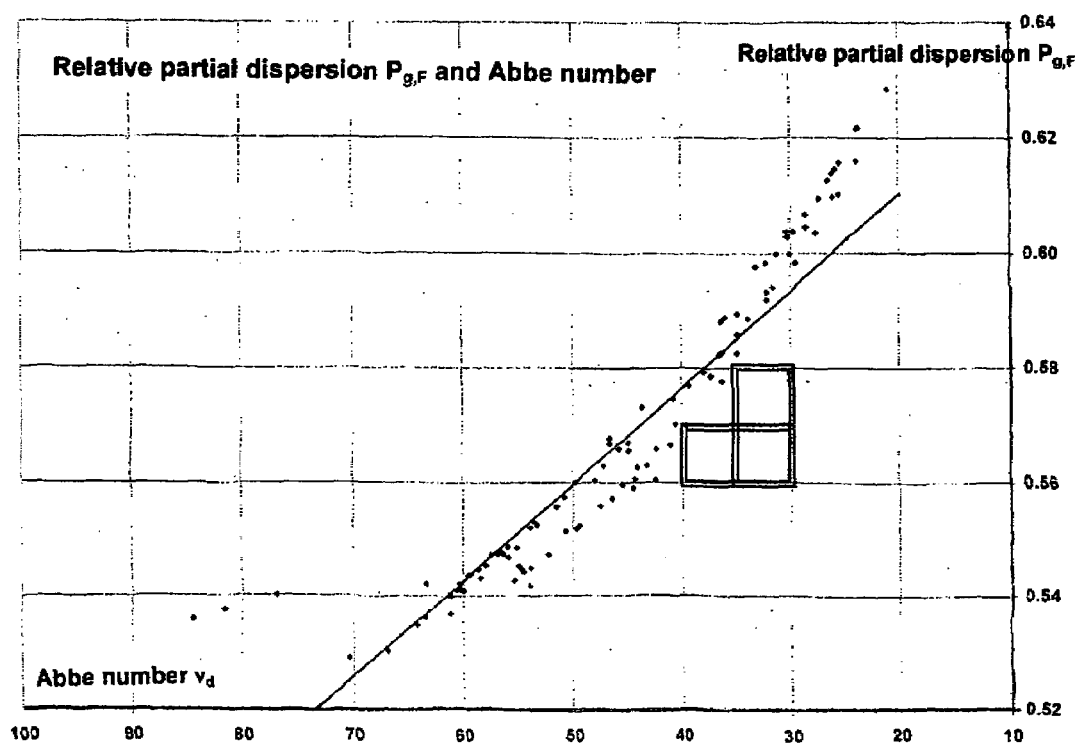

In the diagram according to FIG. 2b, the Abbe number for special glasses and single crystal materials is plotted against the relative partial dispersion ($P_{g,F}$). As can be easily seen in FIG. 2b, the combination of an Abbe number of between about 30 and 35 and a relative partial dispersion of between about 0.56 and 0.58 (see rectangle in FIG. 2b) cannot be achieved with glasses. As can be easily seen further in FIG. 2b, the combination of an Abbe number of between 30 and 40 and a relative partial dispersion of between 0.56 and 0.57 cannot be achieved with conventional glasses (see rectangle in FIG. 2b). As will be explained below in more detail, opto-ceramics according to the present invention having Abbe numbers and relative partial dispersions within the above mentioned parameter ranges can be produced. This provides the possibility to use novel combinations of materials for the achromatization and/or apochromatization of lens systems.

Figure 2C:
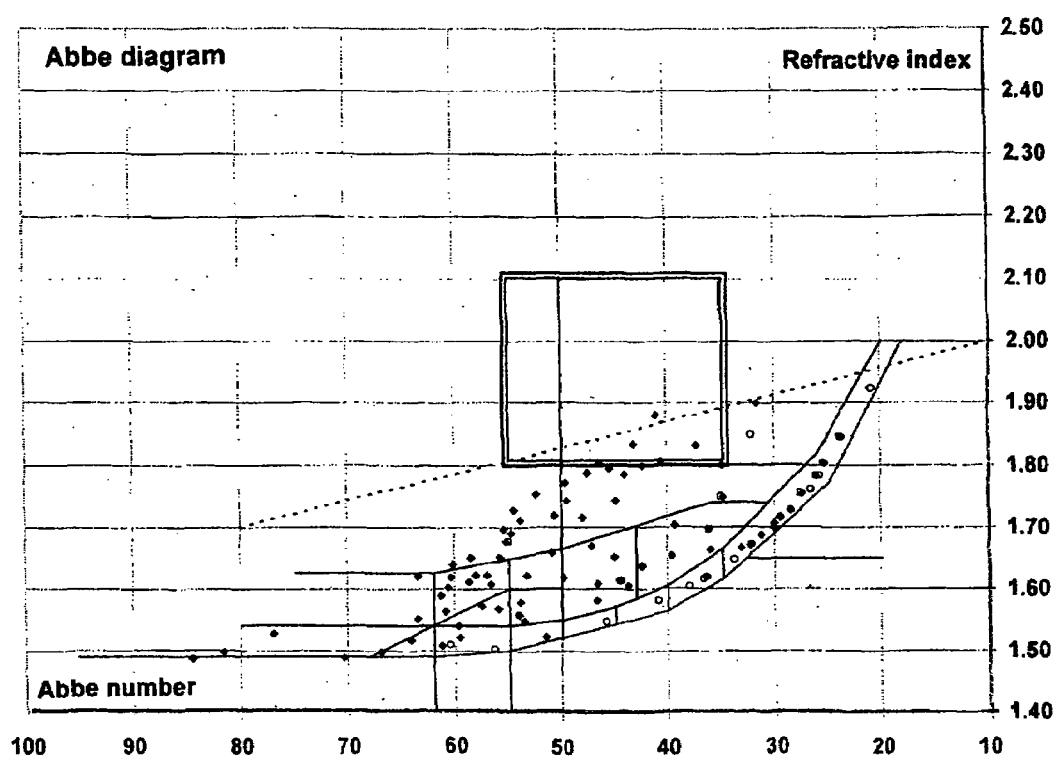

In FIG. 2c, the Abbe number is plotted against the refractive index of different glasses. As can be easily seen in FIG. 2c, glasses having a refractive index of between 1.8 and 2.2 and an Abbe number of between 35 and 55 cannot be produced conventionally with sufficient quality. As will be explained below in more detail, opto-ceramics according to the present invention having Abbe numbers and refractive indices within the above mentioned parameter range can be produced. This provides the possibility to use novel combinations of materials for the achromatization of lens systems.

It has been found, that samples of e.g. cubic Y-stabilized $ZrO_2$, wherein the contents of yttrium oxide were low, still show a brightening between crossed polarizers. This indicates either tensions resulting from the production process or lowering of the symmetry which can be eliminated with higher contents of $Y_2O_3$. Due to comparisons with other opto-ceramics prepared by similar methods, e.g. those which are described in this document (garnets), it is likely that a lowering of the symmetry has taken place. Tensions originating from the production process are, if at all, only of lower relevance.

Further it has been surprisingly found that the birefringence significantly decreases with an increasing content of the stabilizing oxides, in particular of $Y_2O_3$. By an adjustment of the content of $Y_2O_3$, the birefringence can be decreased to values of lower than 50 nm/cm, preferably lower than 20 nm/cm, particularly preferably lower than 10 nm/cm.

Comparison samples have a value of at least 50 nm/cm, the content of $Y_2O_3$ was 10% by mole.

The values of the birefringence become lower, if in the material amounts of $Y_2O_3$ of higher than 10% by mole, further higher than 12% by mole, preferably higher than 15% by mole, particularly preferable higher than 20% by mole are present. In addition by adding higher amounts of $Y_2O_3$ optical data like Abbe number and Pg,f can been shifted to desired value close to Abbe=30 or lower or Pg,f<0,56.

Presumably with low contents of $Y_2O_3$, the structure is metric cubic (ratio of the lattice constants c/a=1), but structural—as a result of displacements of oxygen in the structure—tetragonal, probably due to the distortion of bond lengths and/or angles. An indication for the lowering of the space group symmetry is the presence of an X-ray 112-reflection which is only present in the tetragonal space group symmetry.

The upper limit of 45% by mole for the given ranges may also be 40 or 35% by mole. Especially preferable is an amount of at least 20% by mole of yttrium oxide in admixture with zirconium oxide.

Furthermore, for example mixtures of zirconium oxide and 10 to 30 respectively 40 to 50% by mole of gadolinium oxide have a suitable cubic crystal structure. Similar conditions apply to further mixtures of the oxides. By suitable combinations of the oxides, optical properties such as transparency, refractive index, Abbe number and partial dispersion can be adjusted to the respective demands.

In the composition range b), there are mixtures which form stable cubic garnet phases. By a suitable combination of the oxides, optical properties such as transparency, refractive index, Abbe number and partial dispersion can be adjusted to the respective demands.

Preferably, the opto-ceramic according to the present invention has a distribution of the size of crystallites respectively particle sizes in the opto-ceramic which is as homogeneous as possible, in particular, the standard deviation in percent Δr/r is at most 50%, preferably at most 20% and most preferably at most 5%, wherein r is the radius of the crystallites and the standard deviation is defined in the known manner, such as:

$$\Delta r = \sqrt{\overline{r^2} - \overline{r}^2}$$

According to an embodiment of the present invention, the opto-ceramic according to the present invention has a relatively high size of crystallites or particle size, respectively, in particular a diameter of the crystallites in the range of preferably about 1 to 500 μm, more preferably about 10 to 100 μm.

According to an alternative embodiment of the present invention, it is however preferable that the opto-ceramic according to the present invention has a size of crystallites of at most 100 nm, preferably of at most 30 nm and most preferably of at most 20 nm.

According to a particular embodiment, the size of crystallites is at most one tenth of the wavelength of the incident light, i.e. at a wavelength of 193 nm, the size of crystallites is at most about 20 nm. It has been found that opto-ceramics with such a small size of crystallites are most suitable for the use of the opto-ceramic as an optical component for small wavelengths. It has been found that for example at the illumination wavelengths used in microlithography of lower than 300 nm, preferably of lower than 200 nm, opto-ceramic materials with a higher size of crystallites show scattering by the intrinsic birefringence which is too high, by the arbitrary respectively statistic orientation of the single crystallites and the fluctuation of the refractive index which is independent from the location. With a sufficiently low size of crystallites, such as described above, an opto-ceramic can be obtained which has only low scattering, also with the use in optics for small wavelengths, even when the material itself has a high intrinsic birefringence.

For a series of passive optical elements, a possible fluorescence has to be suppressed in a calculated manner. This will be guaranteed by the use of raw materials having an especial high purity.

According to one embodiment, the content of optically active impurities has to be reduced to a minimum. Preferably, this is lower than 100 ppm by weight, preferably lower than 10 ppm by weight, particularly preferably lower than 1 ppm by weight and most preferably, the opto-ceramics are free of these ions, such as Pr, Nd, Sm, Eu, Tb, Dy, Ho, Er, Tm.

According to a further embodiment of the invention, these ions (Pr, Nd, Sm, Eu, Tb, Dy, Ho, Er, Tm) may be added in such amounts that they do not lead to an optical activity (such as laser activity). This in particular applies to amounts of 15% by mole, based on the total amount of oxides, or more. A requirement for that is that for the distinct application self-colouring or fluorescence are not relevant.

Optical elements of opto-ceramics with garnet structure have a total content of active lanthanides, such as Pr, Nd, Sm, Eu, Tb, Dy, Ho, Er and Tm, in the opto-ceramic of either at most 100 ppm by weight or at least 15% by mole, based on the oxides.

FIG. 3 shows a lens group which can be used for example in a compact objective of an electronic device, such as for example a mobile phone. According to FIG. 3, the lens group comprises a first lens L1, an aperture S, a second lens L2 and a third lens L3, from the side of the subject to the side of the image. Lens L1 has a positive refractive power and its concave surface is directed to the side of the subject. The meniscus-shaped second lens L2 has a positive refractive power and its convex surface is directed to the side of the subject. The third lens L3 has a negative refractive power, its concave surface is directed to the side of the subject. The aperture S is arranged between the first lens L1 and the second lens L2 and is, together with the diameter of the lenses, substantially responsible for the F number ("aperture number") of the objective. Element F in FIG. 3 is an IR filter.

Figure 4:
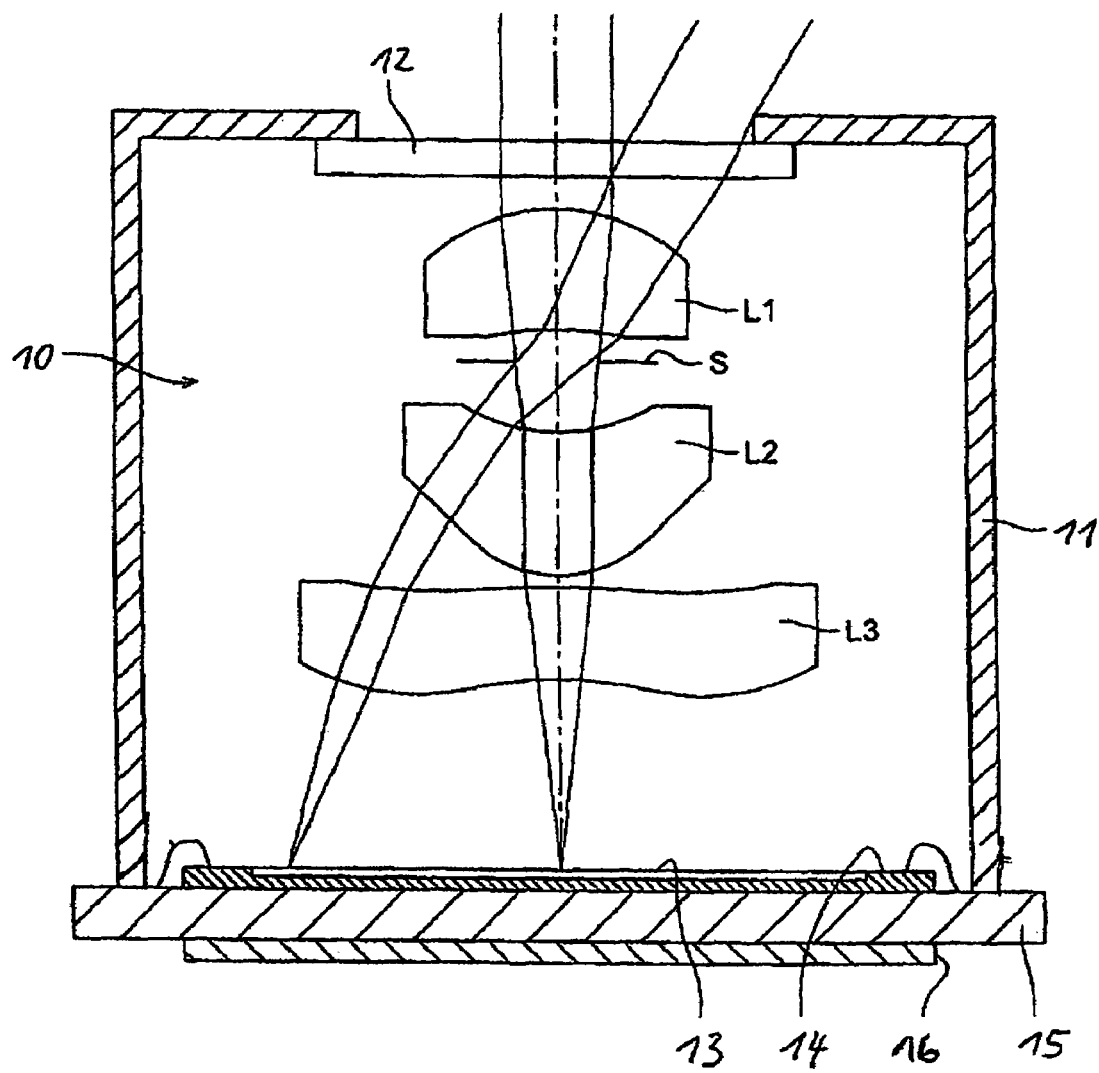
FIG. 4 shows a compact image detection facility having an imaging optic according to FIG. 3.

FIG. 4 shows a typical objective construction, for example as imaging optic for a mobile phone, with a lens group according to FIG. 3 without IR filter which optionally can be added. In one embodiment, the objective had an F number of 2.88 at a focal length of 3.789 mm and a total length of the set-up (up to the photo chip) of 5.55 mm. The lens surfaces of the embodiment are characterized as follows (cp. table 1).

TABLE 1

| Surface number | Type | Radius | Thickness | Refractive index | Abbe number |
|---|---|---|---|---|---|
| 1 | STANDARD | 2.8756846 | 1.00000 | 1.83615 | 52.0 |
| 2 | STANDARD | 7.8848480 | 0.46778 | | |
| 3 | STANDARD | INFINITY | 0.67563 | | |
| 4 | EVENASPHERE | −1.9285155 | 1.22000 | 1.53373 | 56.2 |
| 5 | EVENASPHERE | −0.8781880 | 0.10023 | | |
| 6 | EVENASPHERE | 26.1340307 | 0.78000 | 1.58547 | 29.9 |
| 7 | EVENASPHERE | 1.4992207 | 1.30640 | | |
| 8 | STANDARD | INFINITY | 0.00000 | | |

In this case, surface 1 is the first surface (on the side of the subject) of the lens L1 and surface 2 is the second surface of L1. Surface 3 presents the aperture S, the surfaces 4 and 5 belong to lens L2 and the surfaces 6 and 7 belong to L3. Surface 8 presents the image plane on the sensor.

The surfaces 4 to 7 are aspheric surfaces which can be described by the following equation:

$$z = \frac{r^2/R}{1 + \sqrt{1 - (1+k)\left(\frac{r}{R}\right)^2}} + Ar^2 + Br^4 + Cr^6 + Dr^8 + Er^{10} + Fr^{12}$$

wherein z is the coordinate at the optical axis, r is the coordinate which is perpendicular to the optical axis, R is the radius and k is the conic constant, wherein the aspheric coefficients A to F are given in the following table 2 (the first line belongs to surface 1, the second line belongs to surface 2, etc., according to table 1):

TABLE 2

| k | A | B | C | D | E | F |
|---|---|---|---|---|---|---|
| 0.00000 | 0.0000000E+00 | 0.0000000E+00 | 0.0000000E+00 | 0.0000000E+00 | 0.0000000E+00 | 0.0000000E+00 |
| 0.00000 | 0.0000000E+00 | 0.0000000E+00 | 0.0000000E+00 | 0.0000000E+00 | 0.0000000E+00 | 0.0000000E+00 |
| 0.00000 | 0.0000000E+00 | 0.0000000E+00 | 0.0000000E+00 | 0.0000000E+00 | 0.0000000E+00 | 0.0000000E+00 |
| 2.49013 | 0.0000000E+00 | 4.5847784E−03 | −2.2014130E−01 | 3.3955585E−01 | −1.2063318E−01 | 0.0000000E+00 |
| −3.00965 | 0.0000000E+00 | −2.0115768E−01 | 1.3236346E−01 | −7.9375122E−02 | 2.1769363E−02 | 0.0000000E+00 |
| 206.10032 | 0.0000000E+00 | −5.2044446E−02 | 4.3170905E−02 | −1.8623576E−02 | 4.4501271E−03 | −5.0397923E−04 |
| −9.87569 | 0.0000000E+00 | −6.2359234E−02 | 2.3529507E−02 | −6.5366683E−03 | 1.0292939E−03 | −8.0537075E−05 |
| 0.00000 | 0.0000000E+00 | 0.0000000E+00 | 0.0000000E+00 | 0.0000000E+00 | 0.0000000E+00 | 0.0000000E+00 |

In an embodiment according to the invention, the front lens L1 and the cover glass 12 (cp. FIG. 4) were replaced by a lens of an opto-ceramic according to the present invention having garnet structure with a refractive index of 1.83 and an Abbe number of 52. In FIGS. 5 to 7, the imaging properties have been calculated each, for conventional material combinations using glass lenses (respectively plastic lenses) (FIG. 5a, FIG. 6a respectively FIG. 7a) as well as for the use of the above mentioned material combination of the opto-ceramic according to the present invention for lens L1 (FIG. 5b, FIG. 6b, FIG. 7b). A result was that improvements in the imaging properties had been achieved, namely that the field curvature has been improved by a factor of 2.5, the distortion has been improved by a factor of 3.3, the chromatic aberration (lateral colour) has been improved substantially and the spot size has been improved by 15%.

Overall, thus a compact objective with a total of only three lenses having nearly apochromatic imaging properties could be produced.

LIST OF REFERENCE CHARACTERS

1 Biconvex lens
2 Biconcave lens
3 Disc
4 Spherical lens
10 Image detection facility
11 Casing
12 Cover disc/IR filter
13 Photo sensor
14 Signal processing unit
15 Carrier
16 Substrate
L1 Lens 1 (having concave surface at the side of the subject and concave light emission surface)
L2 Lens 2 (having convex surface at the side of the subject and concave free form light emission surface)
L3 Lens 3 (having convex surface at the side of the subject and concave free form light emission surface)
S Aperture
F Infrared filter

The invention claimed is:

1. A refractive, transmittive or diffractive optical element, comprising a polycrystalline, substantially single-phase opto-ceramic which is transparent for visible light and/or for infrared radiation, wherein the opto-ceramic comprises essentially a composition that can be described by the following formulas $$(1-m)\{z1[ZrO_2]z2[HfO_2](1-z1-z2)[X_2O_3]\}m[A] \text{ or}$$

$$(1-m)\{z1[ZrO_2]z2[HfO_2](1-z1-z2)[MO]\}m[A] \quad \text{a)}$$

wherein z1+z2 is less than or equal to 0.92 and preferably less than or equal to 0.90, wherein z1, z2 and m are higher than or equal to zero, wherein m is less than 0.10 and preferably less than 0.06, more preferably less than 0.03, most preferably close to or equal to zero, and X is selected from Y, Sc, La, Ce, Pr, Nd, Pm, Sm, Eu, Gd, Tb, Dy, Ho, Er, Tm, Yb, Lu; M is selected from Ca and Mg; A represents one ore more additional components particularly selected from $SiO_2$, $Na_2O$, or $TiO_2$;

wherein the crystallites have a cubic crystal structure of the $ZrO_2$ type;

or $$(1-m)\{(M1)_{3+z3}(M2)_{5-z3}O_{12}\}m\{A\} \quad \text{b)}$$

wherein z3 is a value in the range of between −1 and +1, m is a value in the range between 0 and 0.05 and M1 is selected from Y, La, Gd, Lu, Yb, Ce, Pr, Nd, Pm, Sm, Eu, Tb, Dy, Ho, Er, Tm or a mixture of one or more of these elements, wherein the active lanthanides Ce, Pr, Nd, Pm, Sm, Eu, Tb, Dy, Ho, Er and Tm are present in the opto-ceramic in a total amount of either at most 100 ppm by weight, based on the oxides, or at least 15% by mole, based on the oxides;

M2 is selected from one or more of the elements of the group III or IIIa of the periodic table, preferably from Al, Ga, In, Sc or a mixture of two or more of the elements, wherein the crystallites have garnet structure, and A represents one ore more additional components particularly selected from $SiO_2$, $Na_2O$, MgO, CaO, or $TiO_2$.

2. The optical element according to claim 1, variant a), wherein X is selected from Y, Yb and Lu or a mixture of two or the three elements.

3. The optical element according to claim 1, variant a) and/or 2, wherein X is yttrium.

4. A refractive, transmittive or diffractive optical element, comprising a polycrystalline, substantially single-phase opto-ceramic which is transparent for visible light and/or infrared radiation and which is produced from a ceramic powder mixture wherein the ceramic powder mixture comprises:

a) zirconium oxide and/or hafnium oxide, mixed with one or more of the oxides of yttrium, scandium, an oxide of the elements of the lanthanum series or potassium and/or magnesium or b) an oxide of an element of the group III or IIIa of the periodic table, preferably aluminium oxide and/or gallium oxide and/or indium oxide and/or scandium oxide, mixed with one or more of the oxides of gadolinium, lutetium, ytterbium, yttrium, lanthanum, cerium, praseodymium, neodymium, promethium, samarium, europium, terbium, dysprosium, holmium, erbium, thulium, with the proviso that oxides of an active element of the lanthanum series, namely Ce, Pr, Nd, Pm, Sm, Eu, Tb, Dy, Ho, Er and Tm, are present in the opto-ceramic in a total amount of either at most 100 ppm by weight or at least 15% by mole, based on the oxides.

5. The optical element according to claim 4, wherein conventional auxiliary sintering agents are mixed into the ceramic powder mixture.

6. The optical element according to claim 5, wherein the auxiliary sintering agents are one or more, selected from $SiO_2$, $Li_2O$, $Na_2O$, CaO, MgO, $TiO_2$.

7. The optical element according to claim 5, wherein the total content of the one or more sintering agents is less than 0.10 by mole, preferably less than 0.06 by mole, more preferably less than 0.03 by mole with regard to the overall mixture a) or b) and the one or more sintering agents.

8. The optical element according to claim 4, wherein the content of the one or more sintering agent $TiO_2$ with regard to the overall composition containing mixture a) is close to or equal to zero.

9. Optical element according to claim 1, wherein the opto-ceramic has a cubic structure of the $ZrO_2$ type and the refractive index is higher than or equal to 1.90, more preferably in the range of between 1.90 and 2.25, preferably 2.0 to 2.25, and wherein the Abbe number is higher than 30 and more preferably in the range of between 30 and 45.

10. Optical element according to claim 1, wherein the opto-ceramic has a cubic structure of the $ZrO_2$ type and the Abbe number is in the range of between 30 and 35 and wherein a relative partial dispersion is in the range of between 0.56 and 0.58.

11. Optical element according to claim 1, wherein the opto-ceramic has a cubic structure of the $ZrO_2$ type and the Abbe number is in the range of between 30 and 40 and wherein the relative partial dispersion is in the range of between 0.56 and 0.57.

12. Optical element according to claim 1, wherein the opto-ceramic has a garnet structure and the refractive index is higher than or equal to 1.80, more preferably in the range of between 1.80 and 2.20, and wherein the Abbe number is higher than 35, more preferably in the range of between 35 and 55.

13. An imaging optic with lenses of at least two different transparent materials, wherein at least one lens is formed as an optical element according to claim 1.

14. The imaging optic according to claim 13, wherein the lenses are only refractive.

15. The imaging optic according to claim 13, wherein at least one of the lenses has diffractive structures.

16. Imaging optic according to claim 13, further comprising at least one lens of a glass.

17. Imaging optic according to claim 13, wherein the relative partial dispersion ($P_{g,F}$) of the respective glass and the opto-ceramic are similar, preferably with a difference of less than 10%, and wherein the difference of the Abbe numbers of the respective glass and the ceramic is higher than 10.

18. The imaging optic according to claim 17, wherein the opto-ceramic has a relative partial dispersion in the range of between 0.56 and 0.58 and an Abbe number in the range of between 30 and 35 and wherein the respective glass has a relative partial dispersion of between 0.555 and 0.585 and an Abbe number of less than 45.

19. The imaging optic according to claim 18, wherein the Abbe number of the glass is in the range of between 40 and 45.

20. Imaging optic according to claim 19, wherein the glass is selected from a group comprising: N-BAF4, N-BAF52, N-BAF3 or from comparable glasses with respect to their optical position.

21. Imaging optic according to claim 13, wherein the ceramic has a relative partial dispersion in the range of between 0.56 and 0.57 and an Abbe number in the range of between 30 and 40 and wherein the respective glass has a relative partial dispersion in the range of between 0.555 and 0.575 and an Abbe number of less than 50.

22. The imaging optic according to claim 21, wherein the Abbe number of the glass is in the range of between 40 and 50.

23. The imaging optic according to claim 22, wherein the respective glass is selected from a group, comprising: N-SSK8, N-SSK5 or from comparable glasses with respect to their optical position.

24. Imaging optic according to claim 13, wherein the lenses are integrated to a compact objective having a predetermined focal length.

25. The imaging object according to claim 24, wherein a lens which is arranged at a subject side of the imaging optic is formed as an only refractive lens.

26. The imaging object according to claim 25, wherein the lens is a spherical lens.

* * * * *